E. GRAFF.
FEED BAG.
APPLICATION FILED MAR. 1, 1909.
925,434.
Patented June 15, 1909.
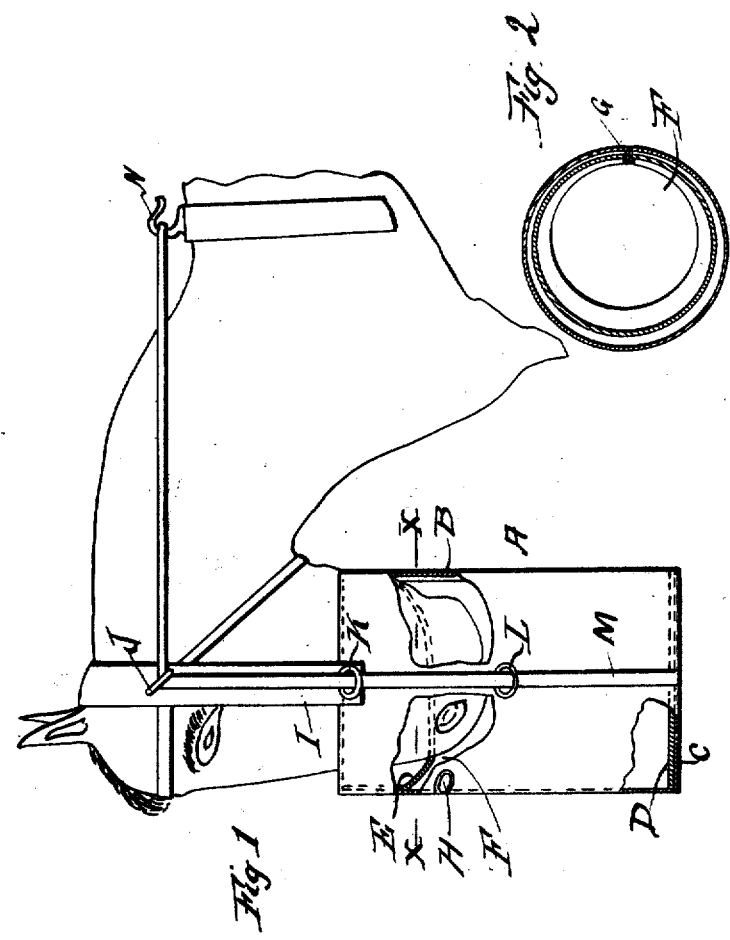
WITNESSES
Francis A. Pocock
J. M. Gallagher
INVENTOR
Emil Graff
BY
ATTORNEY

UNITED STATES PATENT OFFICE.

EMIL GRAFF, OF MANAYUNK, PENNSYLVANIA.

FEED-BAG.

No. 925,434.　　　　Specification of Letters Patent.　　Patented June 15, 1909.

Application filed March 1, 1909. Serial No. 480,578.

*To all whom it may concern:*

Be it known that I, EMIL GRAFF, a citizen of France, residing at Manayunk, in the county of Philadelphia and State of Pennsylvania, have invented a certain new and useful Improvement in Feed-Bags, of which the following is a specification.

My invention relates to a new and useful improvement in feed bags, and has for its object to provide an exceedingly simple and effective device of this character whereby when the horse moves his head downward to reach his feed the bottom of the bag will be drawn upward to his mouth thereby facilitating the feeding of a horse.

Another object of my invention is to provide a feed bag having an internal guard which will prevent the horse spilling the feed as he shakes his head.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a side elevation of a bag made in accordance with my improvement, parts thereof being broken away, the bag is shown in position on a horse's head. Fig. 2, a section at the line X—X of Fig. 1 without the horse's head.

In carrying out my invention as here embodied, A represents the bag composed of the sides B and the bottom C, said bottom may be formed of leather, or some stiffening material D may be placed therein, the object being to prevent the bottom from folding up when being drawn upward toward the horse's mouth as will be hereinafter described.

To the inside surface of the sides of the bag in proximity to the upper end is secured the guard E having an opening F for the horse's nose. The rear portion of this guard is fastened to the seam at the rear of the bag as indicated by G which will prevent the guard turning upward and brings the opening F toward the rear of the bag which permits the horse to more readily place his nose therein. In order that the horse may have plenty of air while eating so that he will take his time I provide the holes H in the sides of the bag below the guard E.

Attached to the upper end of the bag is the strap I which is adapted to pass over the horse's head thereby holding the bag in position. On this strap I is secured the ring J, and to the bag are attached other rings K and L which are in alinement with the ring J.

Secured to the bottom of the bag is a cord, tape or its equivalent M which passes upward through the rings L, K, and J then rearward around the check hook N on the harness.

From the foregoing description it will be seen that as the horse moves his head downward the bottom of the bag will be drawn upward through the medium of the cord M which will bring the feed in the bag in reach of his mouth, and should he raise his head to any height which would cause the feed to move toward the top or inlet of the bag, said feed will be caught by the guard E, and when the horse again brings his head down the feed will drop to the bottom of the bag.

Of course I do not wish to be limited to the exact details of construction here shown as these may be varied within the limits of the appended claims without departing from the spirit of my invention.

Having thus fully described my invention, what I claim as new and useful, is—

1. In combination with a bag having openings formed in the sides thereof, of a guard conforming to the contour of the bag and secured to the inner side portions thereof, said guard having an opening therein which is eccentric to the side walls of the bag, said guard being secured at the rear to the seam of the bag, a stiffening material placed in the bottom of the bag, a strap fastened to the upper end of the bag for attaching the same to the horse's head, a number of rings fastened to the bag and strap, and a cord secured to the bottom of the bag and passing through said rings then over the check hook on the harness which will cause the bottom of the bag to move upward as the horse's head moves downward.

2. In combination with a bag having openings formed in the sides thereof, of a guard conforming to the contour of the bag secured to the inner side portions in proximity to the upper end thereof, said guard having an opening therein which is eccentric to the side walls of the bag and located nearest the rear, said guard being secured at the rear to the seam of the bag and a stiffening material placed in the bottom of the bag, as shown and for the purpose set forth.

In testimony whereof I have hereunto affixed my signature in the presence of two subscribing witnesses.

EMIL GRAFF

Witnesses:
 MARGARETHA VOGT,
 CARRIE EARNSHAW.